US009650009B2

(12) United States Patent
Bana Castro et al.

(10) Patent No.: US 9,650,009 B2
(45) Date of Patent: May 16, 2017

(54) ASSEMBLY FOR ESTHETICALLY DESIGNING AN AIRBAG COVER, AIRBAG COVER, AIRBAG MODULE AND VEHICLE STEERING WHEEL EACH COMPRISING SUCH ASSEMBLY AS WELL AS MANUFACTURING METHOD

(71) Applicant: Dalphi Metal Espana S.A., Madrid (ES)

(72) Inventors: Ramon Bana Castro, Vigo (ES); Victor Jose Gonzales Horta, Pobra do Caraminal (ES); Andreas Maria Joachin Jonietz, Vigo (ES); Jose Rodriguez Estevez, Vigo (ES)

(73) Assignee: Dalphi Metal Espana S.A. (ES)

( * ) Notice: Subject to any disclaimer, the term of this patent is extended or adjusted under 35 U.S.C. 154(b) by 0 days.

(21) Appl. No.: 14/634,973

(22) Filed: Mar. 2, 2015

(65) Prior Publication Data
US 2015/0251625 A1    Sep. 10, 2015

(30) Foreign Application Priority Data

Mar. 4, 2014   (DE) .................... 20 2014 001 873 U

(51) Int. Cl.
| | | |
|---|---|---|
| *B60R 21/215* | (2011.01) | |
| *B60R 21/2155* | (2011.01) | |
| *B60R 21/203* | (2006.01) | |

(52) U.S. Cl.
CPC ........ *B60R 21/2155* (2013.01); *B60R 21/203* (2013.01); *B60R 21/215* (2013.01);
(Continued)

(58) Field of Classification Search
CPC . B60R 21/203; B60R 21/215; B60R 21/2155; B60R 2021/21543;
(Continued)

(56) References Cited

U.S. PATENT DOCUMENTS 5,678,851 A * 10/1997 Saito ................... B60R 13/0206
                                                           280/728.3
5,775,721 A *  7/1998 Grout ................... B60R 21/215
                                                           280/727
(Continued)

FOREIGN PATENT DOCUMENTS

| | | |
|---|---|---|
| DE | 102007045458 | 4/2008 |
| EP | 1495921 | 1/2005 |
| JP | 2008056101 | 3/2008 |

*Primary Examiner* — Barry Gooden, Jr.
(74) *Attorney, Agent, or Firm* — Tarolli, Sundheim, Covell & Tummino LLP

(57) ABSTRACT

The invention relates to an assembly for esthetically designing an airbag cover (30) comprising an annular decoration element (10) for arrangement on a front side (37) of a front wall (31) of the airbag cover (30), the decoration element (10) including at least one securing pin (11) adapted to penetrate the front wall (31). The invention excels by a retaining plate (20) for being attached to a back side (32) of the front wall (31), wherein the retaining plate (20) has at least one clip connector (21) adapted to be engaged with the securing pin (11) such that the decoration element (10) and the retaining plate (20) are permanently connected to each other. Furthermore the invention relates to an airbag cover, an airbag module, a vehicle steering wheel and a manufacturing method.

16 Claims, 5 Drawing Sheets

(52) U.S. Cl.
CPC .............. *B60R 2021/21543* (2013.01); *Y10T 29/49959* (2015.01)

(58) Field of Classification Search
CPC ......... Y10T 29/49954; Y10T 29/49959; Y10T 29/49961
See application file for complete search history.

(56) References Cited

U.S. PATENT DOCUMENTS

| | | | |
|---|---|---|---|
| 6,581,311 B1* | 6/2003 | Davey | B60R 13/005 296/214 |
| 6,613,415 B2* | 9/2003 | Iida | B29C 65/08 264/135 |
| 7,766,371 B2* | 8/2010 | Fujimori | B60R 21/21656 280/728.3 |
| 7,775,550 B2* | 8/2010 | Dominguez Aparicio | B60R 21/2165 280/728.3 |
| 8,459,713 B2* | 6/2013 | Sella | B60R 21/215 280/728.3 |
| 9,027,955 B2* | 5/2015 | Muramatsu | B60R 21/2165 280/728.2 |
| 2005/0067815 A1* | 3/2005 | Dearden | B60R 21/21656 280/728.3 |
| 2008/0079241 A1 | 4/2008 | Fujimori et al. | |
| 2008/0252050 A1 | 10/2008 | Aparicio et al. | |
| 2013/0277952 A1* | 10/2013 | Jung | B60R 21/2165 280/728.3 |
| 2013/0285355 A1* | 10/2013 | Muramatsu | B60R 21/215 280/728.3 |
| 2014/0145419 A1* | 5/2014 | Ishikawa | B60R 21/215 280/728.3 |

* cited by examiner

ASSEMBLY FOR ESTHETICALLY DESIGNING AN AIRBAG COVER, AIRBAG COVER, AIRBAG MODULE AND VEHICLE STEERING WHEEL EACH COMPRISING SUCH ASSEMBLY AS WELL AS MANUFACTURING METHOD

RELATED APPLICATION

This application claims priority from European Patent Application No. 1 495 921 81, filed Mar. 4, 2014, the subject matter of which is incorporated herein by reference.

BACKGROUND OF THE INVENTION

The invention relates to an assembly for esthetically designing an airbag cover according to the preamble of claim 1. Furthermore, the invention relates to an airbag cover comprising such assembly as well as an airbag module and a vehicle steering wheel. Ultimately, the invention also deals with a method of manufacturing an airbag cover. An assembly of the type mentioned in the beginning is known, for example, from EP 1 495 921 B1.

EP 1 495 921 B1 describes an option of arranging a decoration or a decoration element at an airbag cover, especially an airbag cover of a vehicle steering wheel. It is provided in this context to fasten a badge of a car manufacturer with the aid of an annular decoration element to a front wall of the airbag cover. The annular decoration element includes plural securing pins suited for fixing the decoration element in the front wall. The manufacturer's badge itself is placed within the annular decoration element and is retained on the front wall of the airbag cover by the annular decoration element.

It is known from practice to connect decoration elements of this type to the front wall of the airbag cover by a welding process. This manufacturing variant is comparatively complex, which entails increased production times and manufacturing costs. In addition, in the welding process the securing pins are deformed, wherein the shape of the securing pins cannot be exactly reproduced after deformation. This results in differences in different airbag covers which may affect the behavior of the airbag cover when the airbag is released.

The object underlying the invention is to describe an assembly for esthetically designing an airbag cover which enables reproducible manufacture and reduces the time required and the costs of the manufacturing process. Furthermore, it is the object of the invention to describe an airbag cover, an airbag module and a vehicle steering wheel comprising said assembly. It is another object of the invention to state a method of manufacturing an airbag cover.

The afore-mentioned object is achieved, in accordance with the inventions with respect to the assembly by the subject matter of claim 1. Concerning the airbag cover the invention achieves the afore-mentioned object by the subject matter of claim 3. The afore-mentioned object is achieved with respect to the airbag module by the subject matter of claim 14, with respect to the vehicle steering wheel by the subject matter of claim 15 and with respect to the manufacturing method by the subject matter of claim 16.

SUMMARY OF THE INVENTION

The invention is based on the idea to describe an assembly for esthetically designing an airbag cover with an annular decoration element for being arranged on a front side of a front well of the airbag cover. The decoration element includes at least one securing pin adapted to penetrate the front wall. In accordance with the invention, at least one retaining plate is provided for being attached to a back side of the front wall, the retaining plate including at least one clip connector adapted to be engaged with the securing pin so that the decoration element and the retaining plate are permanently connected.

The invention is based on the finding that a clip connection—in contrast to previously employed welded connections—provides an Improvement as regards the reproducibility of the connection between the decoration element and the airbag cover. The clip connection can be easily integrated in the manufacturing process and reduces the energy required for manufacturing the airbag cover, because energy-intensive equipment such as welding equipment can be dispensed with. At the same time, the clip connection is a sufficiently fast connection for retaining the decoration element at the airbag cover when the latter ruptures upon release of an airbag.

In a preferred embodiment of the assembly according to the invention, the retaining plate includes at least two clip connectors each being adapted to be engaged with a securing pin. In other words, at least two securing pins can be provided at the decoration element wherein the retaining plate equally includes at least two clip connectors which are adapted to be clip-connected to the two securing pins of the decoration element. In the mounted state of the assembly a front wall of the airbag cover is clamped between the decoration element and the retaining plate. As the retaining plate includes two clip connectors each being adapted to be connected to a respective securing pin of the decoration element, an enlarged clamping surface is provided at the retaining plate between the two clip connectors. In total the contact face between the retaining plate and the front wall of the airbag cover is thus increased, which entails an improved safe fixing of the assembly to the airbag cover. An especially large-surface contact can be achieved between the retaining plate and the front wall of the airbag cover in that a clip connector is arranged at each longitudinal end of the retaining plate. By arranging the clip connectors at the longitudinal ends it is achieved that the contact face of the retaining plate contacting the back side of the front wall of the airbag cover is tightly pressed to the front wall and thus contributes to a full-surface clamping effect between the retaining plate and the decoration element.

In a preferred configuration of the present invention, the retaining plate is curved in an arc, wherein a radius of curvature of the retaining plate substantially corresponds to a radius of curvature of the annular decoration element. The retaining plate can be substantially formed as a ring segment and can span at least the distance between two securing pins of the decoration element. This contributes to a compact design of the retaining plate and moreover enables the decoration element to be tightly and safely fastened to the airbag cover.

As regards the decoration element, it may be provided in preferred configurations that said decoration element has an outer surface free from ornaments. Thus the decoration element differs from badges or other design elements usually having a trademark-like function of origin. Preferably, it is provided in the present invention that the annular decoration element has primarily a decorative function. A special function of origin indicative of the car manufacturer, for instance, is not intended to be related thereto. Apart from the decorative function, the decoration element also has technical functions, especially regarding the opening behavior of the front wall of the airbag cover upon deployment of an airbag or upon release of an airbag.

The decoration element moreover can have plural securing pins which are arranged spaced apart from each other on an inner surface of the decoration element. The use of plural securing pins improves the contact between the decoration element and the front wall of the airbag cover. In particular, in this way the decoration element is prevented from punctually lifting off the front wall of the airbag cover, for example due to temperature influences, which is undesired for esthetical reasons, on the one hand, and can constitute a risk of injury, on the other hand.

In preferred variants of the present invention, the decoration element has at least two material weakenings. The material weakenings can be formed to be especially diametrically opposed. The material weakenings permit targeted breaking of the decoration element, for example in order not to obstruct opening of an airbag module for deployment of the airbag. In the mounted state, the material weakenings interact with predetermined breaking lines of the airbag cover and of the front wall of the airbag cover, respectively.

According to an independent aspect, the invention relates to the idea of describing an airbag cover comprising an afore-described assembly. The assembly is preferably connected to a front wall of the airbag cover.

In an especially preferred embodiment of the airbag cover according to the invention, the front wall includes a badge area for receiving a badge, the badge area being spaced apart from the decoration element. The front wall may comprise, for example, a badge area and a decoration area, the decoration area and the badge area being visibly separated from each other. Preferably, the badge area is arranged in the center of the front wall and can receive a badge, for instance a manufacturer's badge of a car manufacturer. The decoration area serves for receiving the decoration element and is spaced apart from the badge area.

In a preferred embodiment of the invention, the badge area is arranged to be centered within the decoration area, especially within the decoration element. In other words, the decoration element can encompass or enclose the badge area. Between the central badge area and the decoration element enclosing the same preferably a distance is formed. It may be provided in the particular case that the decoration element has a circular ring shape and also the badge area includes a circular outer edge that the decoration element and the badge area are arranged concentrically to each other.

In an advantageous embodiment of the airbag cover according to the invention, the front wall has at least one predetermined breaking line, wherein the material weakenings of the decoration element are aligned or arranged along the predetermined breaking line. Especially the material weakenings of the decoration element can be arranged to be complementary to the predetermined breaking line and can be aligned with the predetermined breaking line. This ensures that the decoration element forms a rupturing edge jointly with the predetermined breaking line upon deployment of an airbag and the related pressure load on the front wall. The decoration element in so far is involved in the opening of the front wall to release the airbag.

In contrast to the decoration element or decoration area of the front wall, the badge area preferably is not interrupted by a predetermined breaking line. Rather, in preferred configurations of the invention it is provided that the predetermined breaking line at least in portions extends along an outer edge of the badge area. Hence the front wall ruptures upon deployment of the airbag around the badge area so that the badge arranged in the badge area is completely maintained. This prevents a costly design of the badge with additional material weakenings.

Basically it can be provided that in the badge area a badge is disposed, wherein the decoration element is a design element independent of, especially different from the badge. Within the scope of the present application, a clear difference is made between a badge which may bear a manufacturer's logo, for instance, and so far has a trademark-like function of origin and a decoration element in which such trademark-like function of origin takes a merely subordinate role so that rather a decorative design function is in the foreground. Both the badge and the decoration element in total constitute design elements for an airbag cover but are spatially separated from each other on the front wall. This increases the design variety of airbag covers.

Another independent aspect of the invention relates to an airbag module comprising an afore-described airbag cover or an afore-illustrated assembly. Finally, within the scope of an independent aspect of the invention, also a vehicle steering wheel comprising such airbag module and/or an airbag cover and/or an assembly as described before is disclosed and claimed.

Finally the invention achieves the object stated in the beginning by a method of manufacturing an airbag cover, especially according to the type as described before, the manufacturing method comprising the steps of:

a. arranging an annular decoration element on a front wall of the airbag cover, wherein material weakenings of the decoration element are aligned along a predetermined breaking line of the front wall;

b. plug-connecting the decorating element to the front wall wherein at least one securing pin of the decoration element penetrates the front wall; and c. attaching a clip connector of a retaining plate onto the securing pin such that the front wall is clamped between the decoration element and the holding plate and the holding plate is permanently connected to the decoration element.

The method according to the invention facilitates the mounting steps for fastening decoration elements to airbag covers and shows high reproducibility. This in turn reduces the production costs and the energy input required for the production. In particular, welding equipment required for conventional fastening methods can be dispensed with.

BRIEF DESCRIPTION OF THE DRAWINGS

The invention shall be illustrated hereinafter by way of embodiments with reference to the enclosed schematic drawings, in which:

FIG. 1 shows the front view of an airbag cover 30, the airbag cover generally including a front wall 31 which comprises a central badge area 34 on a front side 37. The central badge area 34 is represented as circular badge area 34 in the embodiment according to FIG. 1. Other geometrical shapes of the badge area 34 are possible. For example, the badge area can be trapezoidal, triangular or generally polygonal. In concrete configurations the badge area 34 can have a hexagonal geometry.

Figure 1:
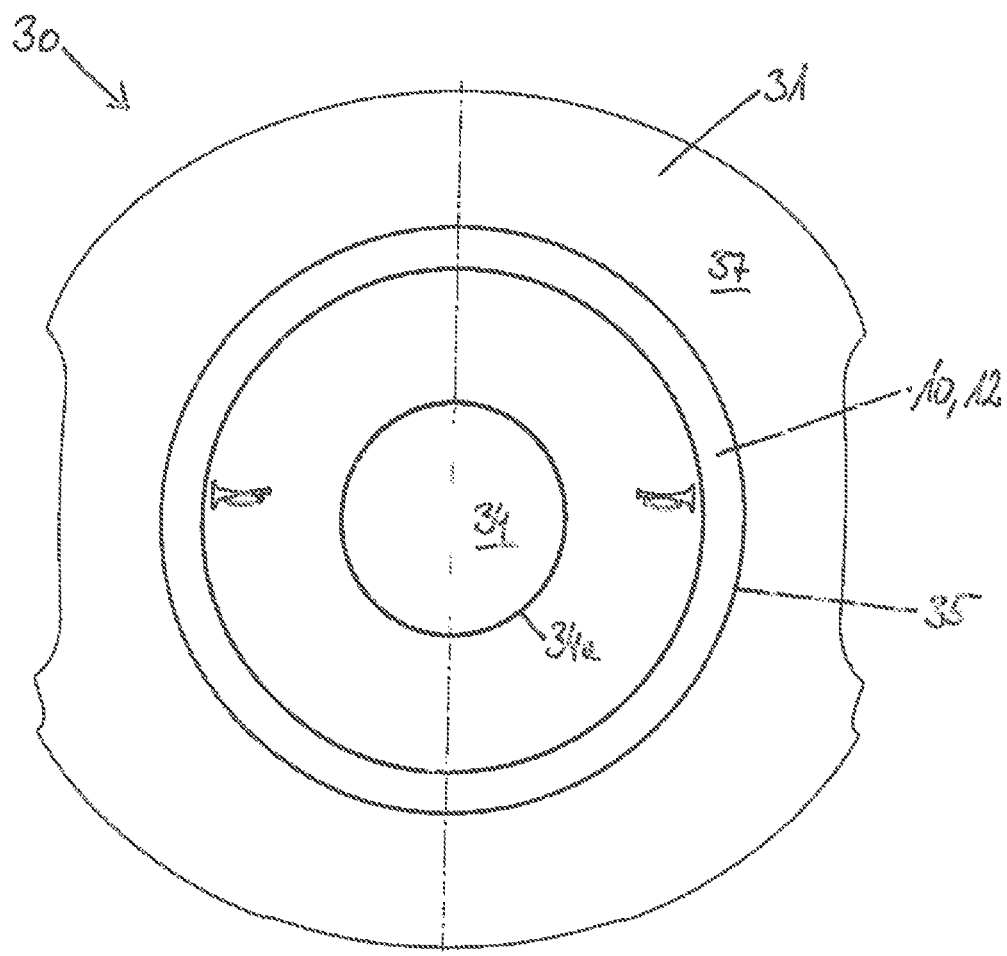
FIG. 1 shows a front view of an airbag cover according to the invention in accordance with a preferred embodiment.

The front wall 31 further bears a decoration element 10 on the front side 37, the decoration element 10 being ring-shaped. In particular, the decoration element 10 surrounds the badge area 34. In the variant shown here in which the badge area 34 is circular the badge area 34 and the decoration element 10 are aligned concentrically to each other. A distance is provided between the badge area 34 and the decoration element 10. In the representation according to FIG. 1 horn symbols ere shown in the space between the badge area 34 and the decoration element 10. In this respect, the airbag cover 30 cannot only be part of an airbag module but also part of a horn module, wherein the horn module and the airbag module are integrally formed. The dot-dash line in FIG. 1 indicates that the front wall 31 is formed preferably to be axially symmetric.

Figure 2:
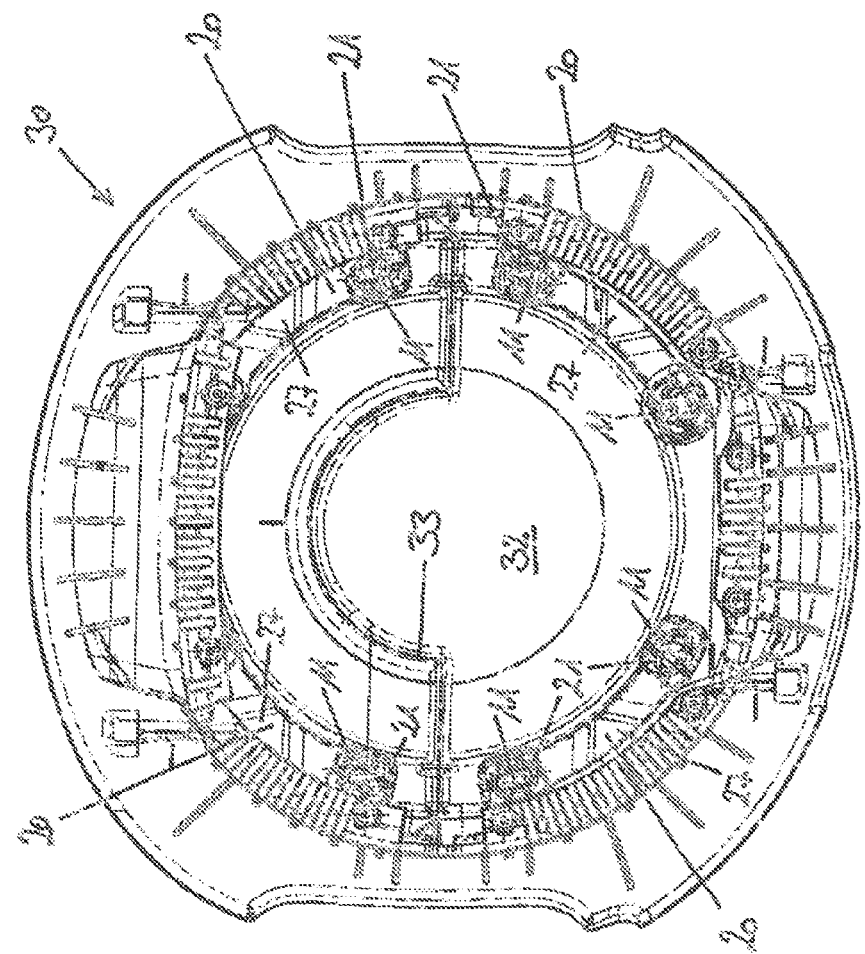
FIG. 2 shows a rear view of the airbag cover according to FIG. 1.

FIG. 2 shows a rear side of the front wall 31. It is clearly visible that the front wall 31 has a predetermined breaking line 33. The predetermined breaking line 33 extends in arc shape in the center of the front wall 31. In particular, the predetermined breaking line 33 extends along an outer edge 34a of the badge area 34. Starting from the badge area 34 the predetermined breaking line extends symmetrically to the axis of symmetry of the front wall 31 and straightly into a decoration area in which the decoration element 10 is disposed.

Figure 3:
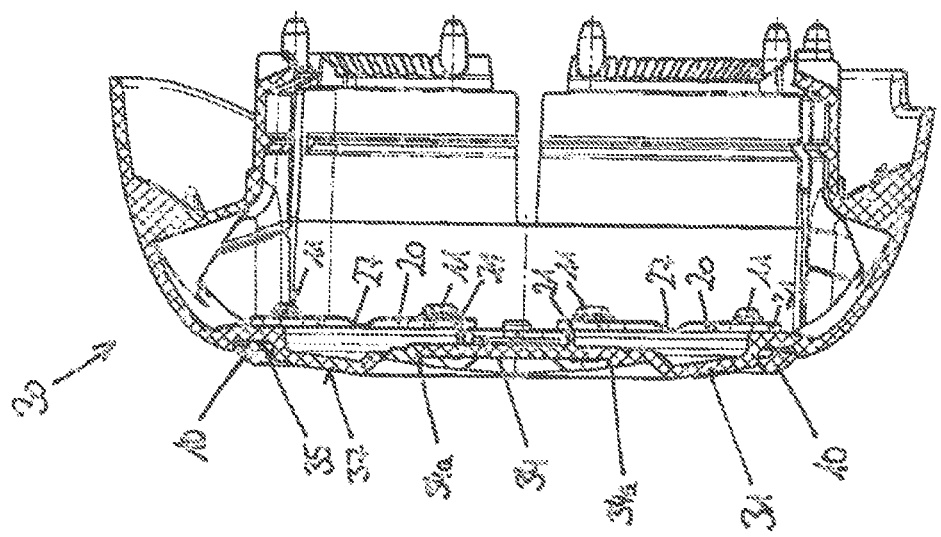
FIG. 3 shows a cross-sectional view of the airbag cover according to FIG. 1.

On a rear side 32 of the front wall 31 furthermore plural holding plates 20 are arranged which are clip-connected to the decoration element 10. Especially four retaining plates 20 are provided, each retaining plate 20 being tightly connected to two securing pins 11 of the decoration element 10. Each retaining plate 20 includes two clip connectors 21 disposed at the longitudinal ends 22 of the retaining plates 20. The clip connectors engage in the securing pins 11 and thus tightly fix the assembly comprising the decoration element 10 and the retaining plate 20 to the front wall 31. The front wall 31 is especially clamped between the decoration element 10 and the retaining wall 20, as is shown in FIG. 3. FIG. 3 shows a cross-sectional view of the airbag cover 30. In the cross-sectional view it is clearly visible that the front wall 31 includes an annular groove 35 on its front side 37. The annular groove 35 is substantially arranged in a boundary area of the front wall 31. The decoration element 10 is inserted in the annular groove 35. The decoration element 10 includes securing pins 11 being disposed at an inner surface 13 of the decoration element 10 and being formed integrally with the decoration element 10. The securing pins 11 extend through the front wall 31 and are connected or clipped to the clip connectors 21. The clip connection is configured so that the decoration element 10 is not detachable from the front wall 31 or the retaining plate 20 in a non-destructive manner.

Figure 4:
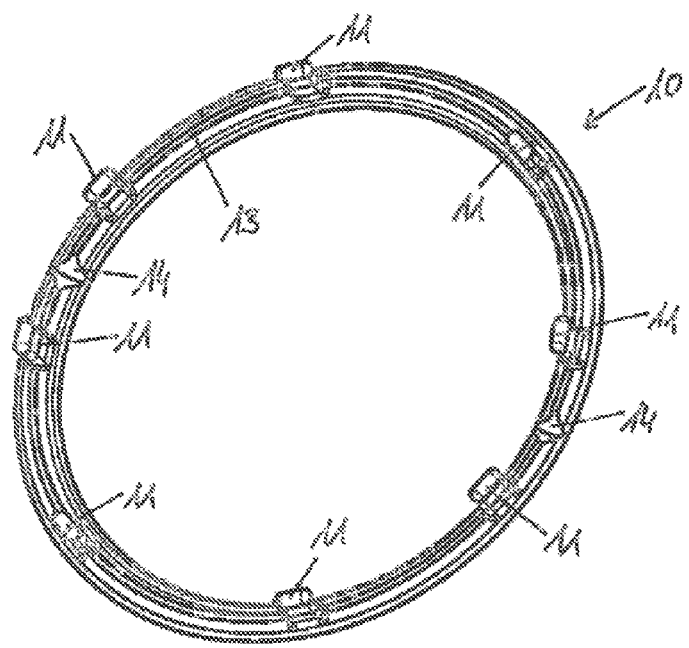
FIG. 4 shows a perspective view of a decoration element of an assembly according to the invention in accordance with a preferred embodiment.
Figure 6:
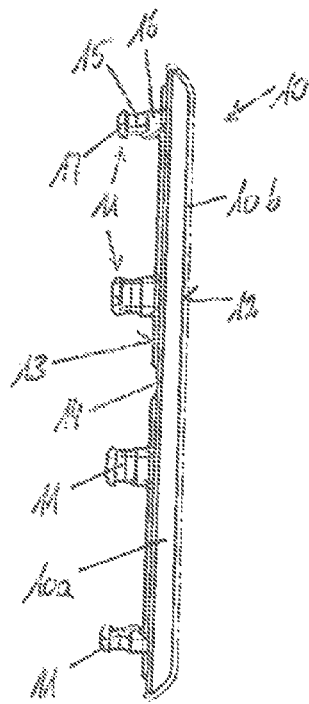
FIG. 6 shows a side view of the decoration element according to FIG. 4.
Figure 5:
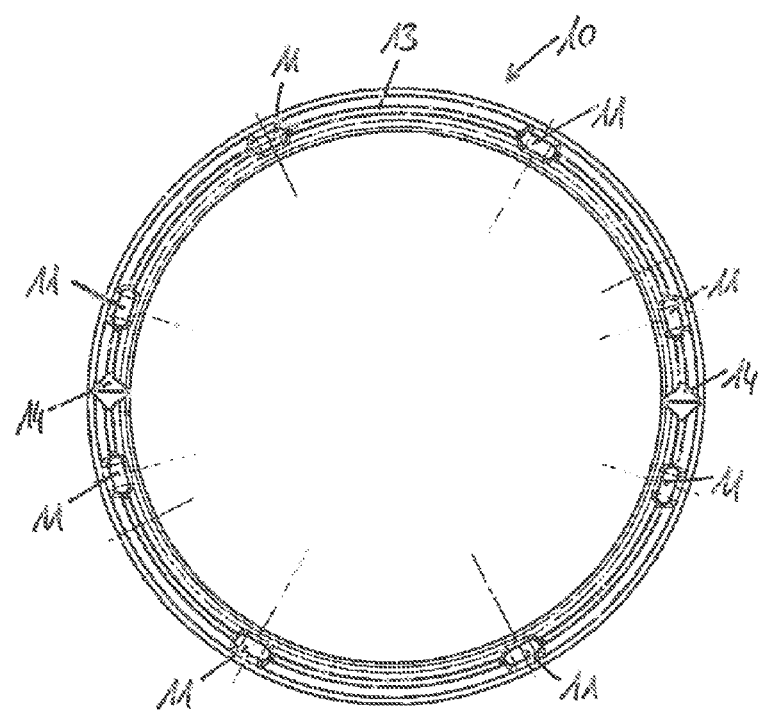
FIG. 5 shows a rear view of the decoration element according to FIG. 4.

The decoration element 10 is shown in detail in FIGS. 4 to 6. The decoration element 10 has a substantially annular design and includes an outer surface 12 and an inner surface 13. The outer surface 12 is visible in the mounted state of the decoration element 10 on the front side of the airbag cover 30 and depicts the decorative function of the decoration element 10 on the outside. The outer surface 12 of the decoration element 10 is preferably designed free from ornaments. This does not exclude that the outer surface 12 includes ribs or grooves and recesses, respectively. Free from ornaments in accordance with the present application rather means that the outer surface 12 substantially has a decorative effect. A trademark-like function of origin is not provided for the decoration element 10 or is merely of minor importance. The trademark-like function of origin is rather reserved to a badge which may be disposed in the badge area 34 of the front wall 31.

The outer surface 12 of the decoration element 10 is preferably smooth. In particular, the outer surface 12 may have or form a chrome-plated or coated surface.

On the inner surface 13 of the decoration element 10 securing pins 11 are arranged which are formed preferably integrally with the decoration element 10. In the illustrated embodiment the securing pins 11 have a substantially oval or oblong cross-sectional profile. Furthermore, each of the securing pins 11 has a taper 15 extending between a base 16 and a mushroom-shaped head 17 (FIG. 6). The design of the securing pins 11 will be discussed later.

Furthermore, it is evident especially from FIG. 5 that the decoration element 10 has two material weakenings 14. The material weakenings 14 are formed on the inner surface 13 so as to ensure a uniform appearance on the outer surface 12. The material weakenings 14 are especially designed as notches extending ever the entire width of the decoration element 10. In this respect, the material weakenings 14 form predetermined breaking points so that the decoration element 10 or the decoration ring can be separated into two ring halves.

In the side view according to FIG. 6, it is moreover evident that the decoration element 10 can have a multi-layered structure. The decoration element 10 can especially include a base member 10a and a coating 10b, the base member 10a comprising the securing pins 11. The coating 10b can be, for example, a chrome-coating or a coat of varnish formed on the outer surface 12.

Figure 7:
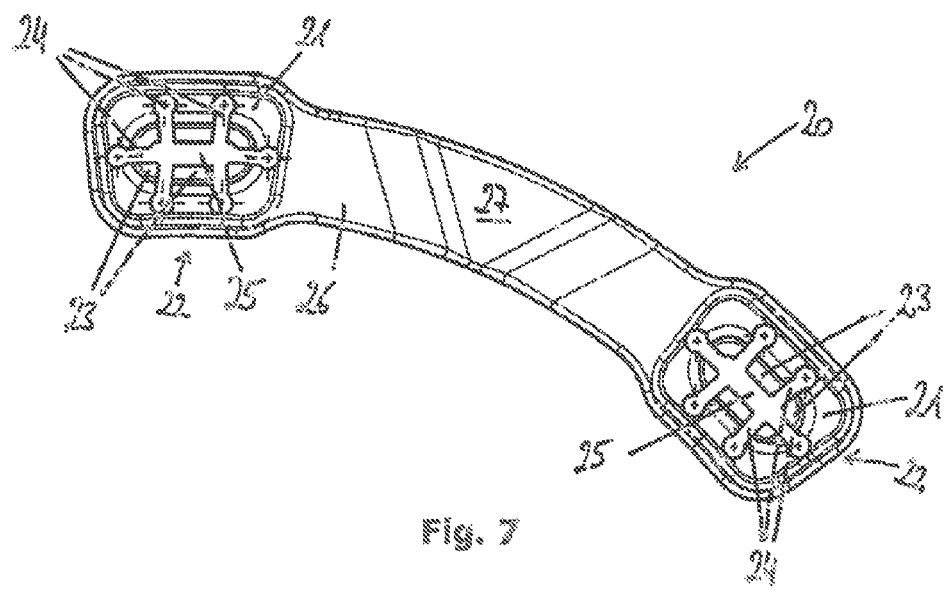
FIG. 7 shows a rear view of a retaining plate of an assembly according to the invention in accordance with a preferred embodiment.
Figure 8:
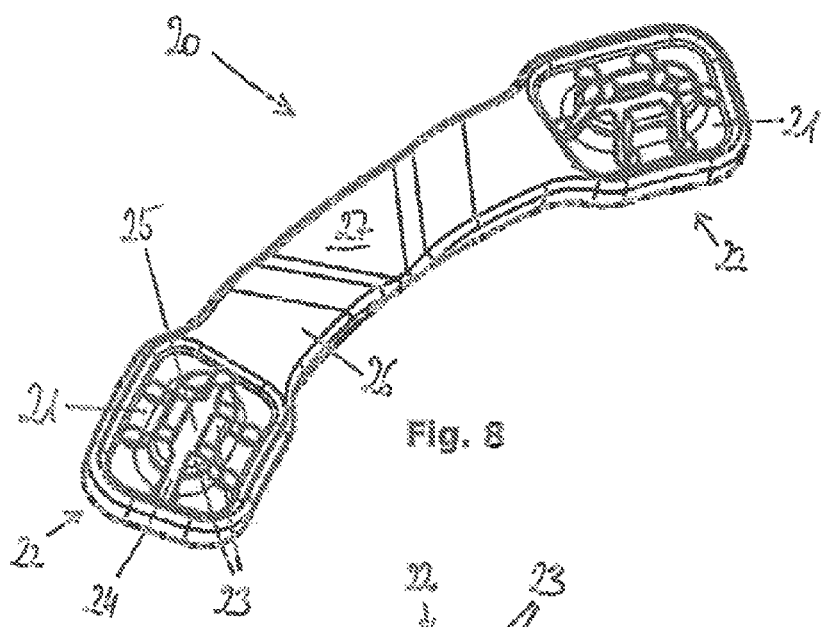
FIG. 8 shows a perspective rear view of the retaining plate according to FIG. 7.
Figure 9:
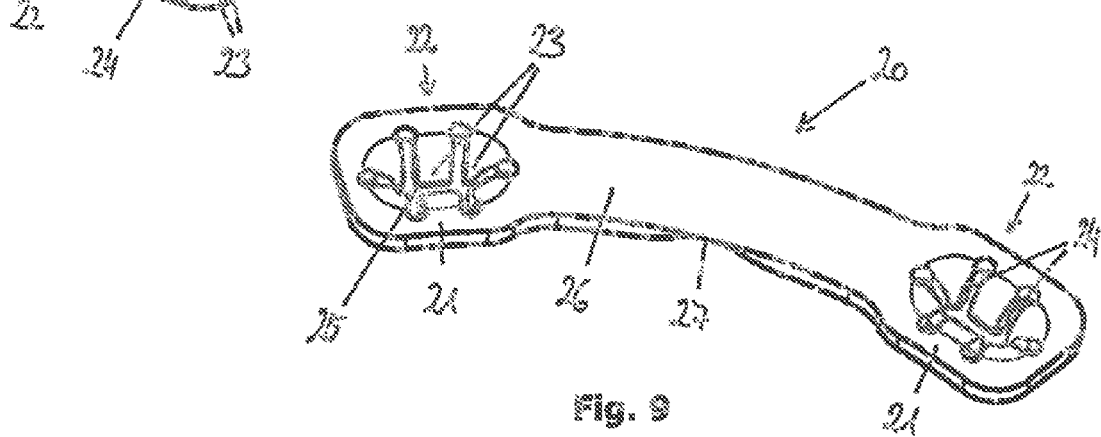
FIG. 9 shows a perspective front view of the retaining plate according to FIG. 7.

In FIGS. 7 to 9 the retaining plate 20 which likewise forms part of the assembly for esthetically designing the airbag cover is illustrated in detail. The retaining plate 20 includes two clip connectors 21 disposed at the longitudinal ends 23 of the retaining plate 20. Each of the clip connectors 21 has a central aperture 25 which is substantially oval or elongate. The aperture 25 geometrically corresponds preferably to the cross-sectional profile of the securing pins 11, but it has smaller dimensions. The aperture 25 is delimited by wings 23 formed at the clip connector 21. The wings are preferably bent so that the ends of the wings 23 protrude from the plane of the retaining plate 20 (FIG. 8). The individual wings 23 are separated from each other by slits 24.

The two clip connectors 21 are interconnected by a connecting web 26 of the retaining plate 20. Concretely speaking, the clip connectors 21 and the connecting web 26 are formed integrally and jointly constitute the retaining plate 20. The connecting web 26 has a curved shape. In total the retaining plate 20 is curved in arc shape. It is provided of preference that the radius of curvature of the retaining plate 20 substantially corresponds to the radius of curvature of the ring-shaped decoration element 10. The distance of the two clip connectors 21 of one single retaining plate 20 from each other preferably corresponds to the distance between two securing pins 11 of the decoration element 10 which are arranged to be directly adjacent to each other.

The connecting web 26 has a V-shaped fillet 27 in a central region. The V-shaped fillet 27 increases the bending flexibility of the retaining plate 20 in the central region so that the retaining plate 20 can deform upon opening of the front wall 31 for releasing an inflating airbag. In this way it is achieved that the front wall 31 springs largely open and thus provides a large release aperture for the inflating airbag.

FIG. 8 illustrates a back side of the retaining plate 20 facing away from the front wall 31 in the mounted state or when the retaining plate 20 is connected to the airbag cover 30. Rather, in the mounted state the back side of the retaining plate 20 faces the airbag disposed inside the airbag cover. On the other hand, FIG. 9 shows a front side of the retaining plate 20 which in the mounted state of the retaining plate 20 faces the back side 32 of the front wall 31. The retaining plate 20 on its front side has a smooth surface so as to ensure perfect clamping contact with the front wall 31. It is equally clearly visible in FIG. 9 that the wings 23 of the clip connectors 21 are bent from the front side of the retaining plate 20 toward the back side of the retaining plate 20 so that the tips of the wings 23 in the mounted state of the retaining plate 20 point away from the front wall 31.

Figure 10:
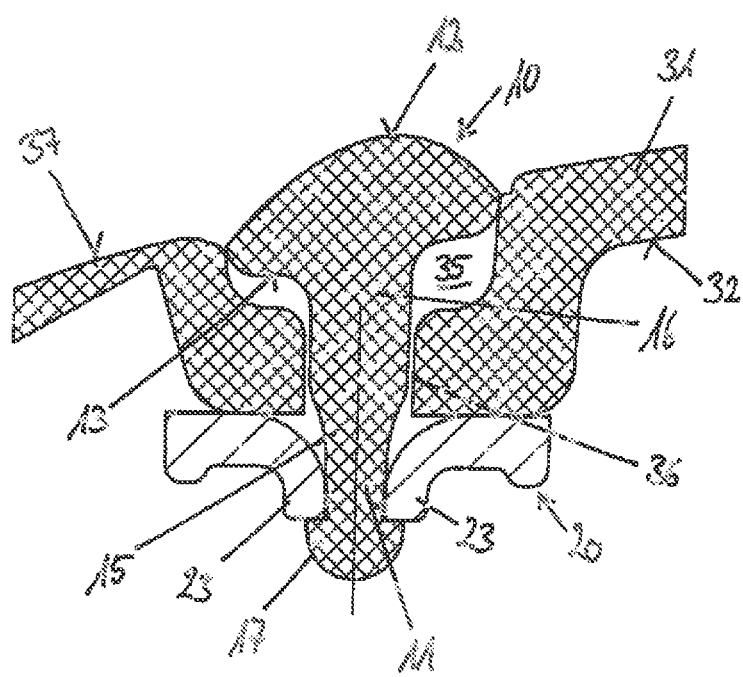
FIG. 10 shows a cross-sectional view of a detail of the assembly according to the invention in the mounted state on an airbag cover.

FIG. 10 illustrates the connection of the assembly consisting of the decoration element 10 and the retaining plate 20 to the front wall 31 of the airbag cover 30 within the scope of a cross-sectional representation. In particular FIG. 10 shows a detailed view of a section across the annular groove 35 of the front wall 31 in which the decoration element 10 is disposed. The decoration element 10 is fixed to be clamped in the annular groove 35 with the aid of the retaining plate 20. In the annular groove 35 of the front wall 31 plural passages 36 are formed which are dimensioned so that a respective securing pin 11 of the decoration element 10 can penetrate a passage 36. In this respect, the passages 36 preferably have an oval and/or elongate shape. The passages 36 are formed in a bottom of the annular groove 35. The decoration element 10 is countersunk in the annular groove 35, the latter having a groove width substantially corresponding to the width of the decoration element 10 and the decoration ring, respectively. The decoration ring has an outer surface 12 exhibiting a bulge. As a whole, the decoration ring or the decoration element 10 is provided with a lens head cross-sectional contour.

Based on the inner surface 13 of the decoration element 10, the securing pin 11 extends through the passage 38. The securing pin 11 includes a base 16 which directly arises from the inner surface 13. The base 16 extends almost completely through the passage 36 and has side faces aligned substantially in parallel to each other. A taper 15 which in the further course opens into a mushroom-shaped head 17 is connected to the base 16, The mushroom-shaped head 17 has a width substantially corresponding to the width of the base 16.

FIG. 10 further shows two wings 23 of the clip connector 21 of a retaining plate 20 in cross-section. It is evident that the wings 23 are deflected from the plane of the retaining plate 20 so that the tips of the wings 23 point away from the front wall 31. The securing pin 11 extends through the aperture 25 delimited by the wings 23 in the clip connector 21 so that the wings 23 get into contact with the securing pin 11 in the taper 15. In the connected state of the decoration element with the retaining plate 20 the mushroom-shaped head 17 of the securing pin 11 substantially forms a step preventing the decoration element 10 from detaching from the retaining plate 20 and thus from the airbag cover 30. The clip connection made in this way is not detachable in a non-destructive manner.

Also, as shown in FIG. 10, the decoration element 10 has an outer surface 12 which is free of ornaments. The shown outer surface 12 is formed in a convex shape in a radial cross-section thereof.

Also, as shown in FIG. 10, a radially inner edge (right hand side of FIG. 12) of the outer surface 12 of the decoration element 10 is further distant from a contact surface of the retaining plate 20 which contacts the back side 32 of the airbag cover 30 than a radially outer edge (left hand side of FIG. 12) of the outer surface 12 of the decoration element 10.

Accordingly, as stated above, the invention relates to an assembly for esthetically designing an airbag cover 30 comprising an annular decoration element 10 for arrangement on a front side 37 of a front wall 31 of the airbag cover 30, the decoration element 10 including at least one securing pin 11 adapted to penetrate the front wall 31. The invention excels by a retaining plate 20 for being attached to a back side 32 of the front wall 31, wherein the retaining plate 20 has at least one clip connector 21 adapted to be engaged with the securing pin 11 such that the decoration element 10 and the retaining plate 20 are permanently connected to each other. Furthermore the invention relates to an airbag cover, an airbag module, a vehicle steering wheel and a manufacturing method.

LIST OF REFERENCE NUMERALS 10 decoration element
10a base member
10b coating
11 securing pin
12 outer surface
13 inner surface
14 material weakening
15 taper
16 base
17 bead
20 retaining plate
21 clip connector
22 longitudinal end
23 wing
24 slit
25 aperture
26 connecting web
27 fillet
30 airbag cover
31 front wall
32 back side
33 predetermined breaking line
34 badge area
34a outer edge
35 annular groove
36 passage

The invention claimed is:

1. An assembly for esthetically designing an airbag cover (30) comprising an annular decoration element (10) for arrangement on a front side (37) of a front wall (31) of the airbag cover (30), the decoration element (10) having at least one securing pin (11) adapted for penetrating the front wall (31), wherein a retaining plate (20) having a substantially ring segment configuration for being arranged at a back side (32) of the front wall (31), the retaining plate (20) having at least one clip connector (21) adapted to be engaged with the at least one securing pin (11) so that the decoration element (10) and the retaining plate (20) are permanently connected to each other, the retaining plate having a curved arcuate configuration with a radius of curvature that substantially corresponds to a radius of curvature of the annular decoration element (10).

2. The assembly according to claim 1, wherein the decoration element (10) has an outer surface (12) which is preferably free of ornaments and which outer surface (12) is formed in a convex shape in a radial cross-section, and/or in that a radially inner edge of the outer surface (12) of the decoration element (10) is further distant from a contact surface of the retaining plate (20) which contacts the back side (32) of the airbag cover (30) than a radially outer edge of the outer surface (12) of the decoration element (10).

3. The assembly according to claim 1, wherein the decoration element (10) has plural securing pins (11) which are spaced from each other on an inner surface (13) of the decoration element (10).

4. The assembly according to claim 1, wherein the decoration element (10) includes at least two material weakenings (14) which are especially formed to be diametrically opposed.

5. An airbag module comprising an airbag cover (30) and/or an assembly according to claim 1.

6. A vehicle steering wheel comprising an assembly according to claim 1.

7. The assembly according to claim 1, wherein the retaining plate (20) has at least two clip connectors (21) each adapted to be engaged with a respective one of the at least one securing pin (11).

8. The assembly according to claim 7, wherein a respective one of the at least two clip connectors (21) is arranged at a longitudinal end (22) of the retaining plate (20).

9. An airbag cover (30) comprising an assembly according to claim 1, which is connected to the front wall (31) of the airbag cover (30).

10. A method of manufacturing an airbag cover (30), especially according to claim 9, comprising the steps of:
 a. arranging an annular decoration element (10) on a front wall (31) of the airbag cover (30), wherein material weakenings (14) of the decoration element (10) are aligned along a predetermined breaking line (33) of the front wall (31);
 b. plug-connecting the decoration element (10) to the front wall (31), wherein at least one securing pin (11) of the decoration element (10) penetrates the front wall (31);
 attaching a clip connector (21) of a retaining plate (20) to the securing pin (11) so that the front wall (31) is clamped between the decoration element (10) and the retaining plate (20) and the retaining plate (20) is permanently connected to the decoration element (10).

11. The airbag cover according to claim 9, wherein the front wall (31) has a badge area (34) for receiving a badge, wherein the badge area (34) is arranged to be spaced apart from the decoration element (10).

12. The airbag cover (30) according to claim claim 11, wherein the badge area (34) is arranged to be centered within the decoration element (10).

13. The airbag cover (30) according to claim 11, wherein in the badge area (34) a badge is arranged, wherein the decoration element (10) is a design element independent of, especially different from the badge.

14. The airbag cover (30) according to claim 11, wherein the front wall (31) has at least one predetermined breaking line (33), wherein material weakenings (14) of the decoration element (10) are aligned or arranged along the at least one predetermined breaking line (33).

15. The airbag cover (30) according to claim 14, wherein the at least one predetermined breaking line (33) at least in portions extends along an outer edge (34a) of the badge area (34).

16. An assembly for an airbag cover, the assembly comprising:
 an annular decoration element arranged on a front side of a front wall of the air bag cover and having a periphery with a first radius of curvature, the annular decoration element having a securing pin that penetrates the front wall, and
 an arc shaped retaining plate substantially formed as a ring segment, the arc shaped retaining plate being arranged on a back side of the front wall and having a second radius of curvature, the first radius of curvature substantially corresponding to the second radius of curvature so that the decoration element and retaining plate overlie each other and follow the same general contour, the arc shaped retaining plate having a clip connector that is configured to engage with the securing pin to permanently connect the decoration element with the retaining plate.

* * * * *